(12) United States Patent (10) Patent No.: US 12,102,114 B2
Rogan et al. (45) Date of Patent: Oct. 1, 2024

(54) AEROSOL GENERATING ARTICLES

(71) Applicant: JT International S.A., Geneva (CH)

(72) Inventors: Andrew Robert John Rogan, Forres (GB); Mark Gill, London (GB); Takeshi Akiyama, Geneva (CH); Keisuke Matsuzaka, Tottori (JP)

(73) Assignee: JT International S.A. (CH)

( * ) Notice: Subject to any disclaimer, the term of this patent is extended or adjusted under 35 U.S.C. 154(b) by 925 days.

(21) Appl. No.: 17/262,493

(22) PCT Filed: Jul. 5, 2019

(86) PCT No.: PCT/EP2019/068104
§ 371 (c)(1),
(2) Date: Jan. 22, 2021

(87) PCT Pub. No.: WO2020/020604
PCT Pub. Date: Jan. 30, 2020

(65) Prior Publication Data
US 2021/0282457 A1 Sep. 16, 2021

(30) Foreign Application Priority Data
Jul. 26, 2018 (EP) .................................. 18185821

(51) Int. Cl.
*A24C 5/01* (2020.01)
*A24D 1/20* (2020.01)
(Continued)

(52) U.S. Cl.
CPC .................. *A24C 5/01* (2020.01); *A24D 1/20* (2020.01); *A24D 3/17* (2020.01); *A24F 40/20* (2020.01);
(Continued)

(58) Field of Classification Search
CPC ........ A24F 40/20; A24F 40/465; A24F 40/42; A24D 1/20; A24D 3/17; A24C 5/01
See application file for complete search history.

(56) References Cited

U.S. PATENT DOCUMENTS 5,249,586 A   10/1993  Morgan et al.
5,388,594 A    2/1995  Counts et al.
(Continued)

FOREIGN PATENT DOCUMENTS

CN    103987286 A    8/2014
CN    106255429 A   12/2016
(Continued)

OTHER PUBLICATIONS

International Search Report for PCT/EP2019/068101 mailed Nov. 19, 2019; 3 pages.
(Continued)

*Primary Examiner* — Michael H. Wilson
*Assistant Examiner* — Stephanie Lynn Moore
(74) *Attorney, Agent, or Firm* — Lerner David LLP

(57) ABSTRACT

An aerosol generating article includes a substantially cylindrical cup containing a plant-based aerosol generating material and at least one inductively heatable susceptor element (26). The cup includes an open end and a bottom wall. The cup has a self-supporting moulded form and includes a flange at the open end and a closure attached to the flange. The closure and/or bottom wall is porous or includes one or more openings.

28 Claims, 9 Drawing Sheets

(51) Int. Cl.
*A24D 3/17* (2020.01)
*A24F 40/20* (2020.01)
*A24F 40/465* (2020.01)
*A24F 40/70* (2020.01)
*B65B 1/04* (2006.01)
*B65B 7/28* (2006.01)
*B65B 61/20* (2006.01)
*H05B 3/36* (2006.01)
*H05B 6/10* (2006.01)

(52) U.S. Cl.
CPC ............ *A24F 40/465* (2020.01); *A24F 40/70* (2020.01); *B65B 1/04* (2013.01); *B65B 7/2807* (2013.01); *B65B 7/2842* (2013.01); *B65B 61/207* (2013.01); *H05B 3/36* (2013.01); *H05B 6/105* (2013.01)

(56) References Cited

U.S. PATENT DOCUMENTS

| | | | |
|---|---|---|---|
| 5,613,505 A * | 3/1997 | Campbell | H05B 6/365 131/194 |
| 5,692,291 A | 12/1997 | Deevi et al. | |
| 10,499,685 B2 | 12/2019 | Prestia et al. | |
| 2008/0092912 A1 * | 4/2008 | Robinson | A24F 40/40 131/200 |
| 2014/0373856 A1 | 12/2014 | Zuber et al. | |
| 2015/0027461 A1 * | 1/2015 | Liu | A24F 40/40 131/329 |
| 2015/0272219 A1 | 10/2015 | Hatrick et al. | |
| 2016/0205992 A1 * | 7/2016 | Bell | A24B 15/287 |
| 2017/0055574 A1 | 3/2017 | Kaufman et al. | |
| 2017/0086508 A1 | 3/2017 | Mironov et al. | |
| 2017/0143039 A1 | 5/2017 | Buehler et al. | |
| 2017/0156403 A1 * | 6/2017 | Gill | A24F 40/42 |
| 2017/0311648 A1 | 11/2017 | Gill et al. | |
| 2018/0103684 A1 * | 4/2018 | Liu | A24F 7/02 |
| 2018/0295885 A1 | 10/2018 | Rojo-Calderon et al. | |
| 2018/0310623 A1 | 11/2018 | Batista | |
| 2019/0053535 A1 | 2/2019 | Apetrei Birza | |
| 2019/0059449 A1 * | 2/2019 | Akiyama | A24F 42/10 |
| 2019/0152627 A1 | 5/2019 | Ghiotti et al. | |
| 2019/0208813 A1 * | 7/2019 | Rojo-Calderon | A24D 1/20 |
| 2019/0239555 A1 | 8/2019 | Nicholson | |
| 2021/0368860 A1 * | 12/2021 | Reevell | A24B 15/281 |

FOREIGN PATENT DOCUMENTS

| | | |
|---|---|---|
| CN | 106455726 A | 2/2017 |
| CN | 107105776 A | 8/2017 |
| CN | 107529812 A | 1/2018 |
| CN | 107920598 A | 4/2018 |
| CN | 108135263 A | 6/2018 |
| CN | 108135275 A | 6/2018 |
| CN | 108135277 A | 6/2018 |
| EP | 0503767 A1 | 9/1992 |
| EP | 3260001 A1 | 12/2017 |
| JP | H5115272 A | 5/1993 |
| JP | H7184627 A | 7/1995 |
| JP | H11-178562 A | 7/1999 |
| JP | 2017518746 A | 7/2017 |
| JP | 2017-526381 A | 9/2017 |
| JP | 2018-502587 A | 2/2018 |
| WO | 2015176898 A1 | 11/2015 |
| WO | 2015177516 A1 | 11/2015 |
| WO | 2015198015 A1 | 12/2015 |
| WO | 2017/001352 A2 | 1/2017 |
| WO | 2017/001818 A1 | 1/2017 |
| WO | 2017001819 A1 | 1/2017 |
| WO | 2017/036959 A1 | 3/2017 |
| WO | 2017051350 A2 | 3/2017 |
| WO | 2017068093 A1 | 4/2017 |
| WO | 2017068095 A1 | 4/2017 |
| WO | 2017068096 A1 | 4/2017 |
| WO | 2017068099 A1 | 4/2017 |
| WO | 2017068100 A1 | 4/2017 |
| WO | 2017068101 A1 | 4/2017 |
| WO | 2017108992 A1 | 6/2017 |
| WO | 2017182485 A1 | 10/2017 |
| WO | 2018002084 A1 | 1/2018 |
| WO | 2018046946 A1 | 3/2018 |

OTHER PUBLICATIONS

International Search Report for PCT/EP2019/068104 mailed Nov. 14, 2019; 4 pages.
International Sarch Report for PCT/EP2019/069957 mailed Nov. 14, 2019; 5 pages.
Search Report dated May 12, 2022 from Office Action for Chinese Application No. 201980049279 issued May 18, 2022. 3 pgs.

* cited by examiner

AEROSOL GENERATING ARTICLES

CROSS-REFERENCE TO RELATED APPLICATIONS

The present application is a national phase entry under 35 U.S.C. § 371 of International Application No. PCT/EP2019/068104, filed Jul. 5, 2019, published in English, which claims priority to European Application No. 18185821.8 filed Jul. 26, 2018, the disclosures of which are incorporated herein by reference.

TECHNICAL FIELD

The present disclosure relates generally to aerosol generating articles, and more particularly to an aerosol generating article for use with an aerosol generating device for heating the aerosol generating article to generate an aerosol for inhalation by a user.

TECHNICAL BACKGROUND

Devices which heat, rather than burn, an aerosol generating material to produce an aerosol for inhalation have become popular with consumers in recent years.

Such devices can use one of a number of different approaches to provide heat to the aerosol generating material. One such approach is to provide an aerosol generating device which employs an induction heating system and into which an aerosol generating article, comprising aerosol generating material, can be removably inserted by a user. In such a device, an induction coil is provided with the device and an inductively heatable susceptor is provided typically with the aerosol generating article. Electrical energy is supplied to the induction coil when a user activates the device which in turn generates an alternating electromagnetic field. The susceptor couples with the electromagnetic field and generates heat which is transferred, for example by conduction, to the aerosol generating material and a vapour or aerosol is generated as the aerosol generating material is heated.

The characteristics of the aerosol generated by the aerosol generating device are dependent upon a number of factors, including the construction of the aerosol generating article used with the aerosol generating device. There is, therefore, a desire to provide an aerosol generating article which enables the characteristics of the aerosol generated during use of the article to be improved.

SUMMARY OF THE DISCLOSURE

According to a first aspect of the present disclosure, there is provided an aerosol generating article comprising:
  a substantially cylindrical cup containing a plant-based aerosol generating material and at least one inductively heatable susceptor element, wherein the cup comprises an open end and a bottom wall;
  the cup having a self-supporting moulded form and including a flange at the open end and a closure attached to the flange;
  wherein the closure and/or bottom wall is porous or comprises one or more openings.

The aerosol generating article is for use with an aerosol generating device for heating the plant-based aerosol generating material, without burning the aerosol generating material, to volatise at least one component of the plant-based aerosol generating material and thereby generate a vapour which cools and condenses to form an aerosol for inhalation by a user of the aerosol generating device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The use of at least one inductively heatable susceptor element provides a convenient, effective and energy efficient way to heat the plant-based aerosol generating material. When the aerosol generating article is positioned in an aerosol generating device and exposed to an alternating electromagnetic field, heat is generated in the inductively heatable susceptor element due to eddy currents and magnetic hysteresis losses resulting in a conversion of energy from electromagnetic to heat. The heat generated in the inductively heatable susceptor element is transferred to the plant-based aerosol generating material whereupon it is heated to generate a vapour which cools and condenses to form an aerosol with the desired characteristics.

The cup may include a substantially cylindrical side wall. The bottom wall may be substantially circular. The closure may be substantially circular. The cylindrical form of the resulting aerosol generating article with its substantially circular cross-section may facilitate packaging of multiple aerosol generating articles and/or may facilitate insertion of the aerosol generating article into a correspondingly shaped heating compartment of an aerosol generating device.

The flange may extend outwardly away from the side wall, for example in a radially outward direction. Thus, the flange does not extend across the open end of the cup, thereby facilitating the flow of fluid (e.g. air and/or vapour and/or aerosol) through the cup during use of the aerosol generating article with an aerosol generating device. In embodiments in which the side wall is substantially cylindrical, the flange may comprise a substantially circular lip.

The bottom wall may comprise a plurality of openings. In other words, the bottom wall may be perforated. The openings may be substantially circular and may have a diameter between 0.5 mm and 5 mm, preferably between 1.0 mm and 2.5 mm. In some embodiments, the bottom wall may comprise a first opening which may have a diameter between 1.2 mm and 2.5 mm and a plurality of second openings which may be positioned around the central opening. The first opening may be configured for the insertion of a temperature sensor when the aerosol generating article is positioned in an aerosol generating device. The first opening may be a central opening and the second openings may be peripheral openings. The first opening may also be omitted. The bottom wall may comprise between 5 and 10 of said second or peripheral openings. The second or peripheral openings may be substantially circular and may have a diameter between 0.5 mm and 1 mm. The second openings are typically smaller than the first opening.

The openings intended to form air and/or flavour flow passages, i.e., the second openings, are preferably sized to be smaller than the particle size (D90) of the plant-based aerosol generating material. As a result, no significant loss of material is observed through the bottom wall of the cup. The particle size in volume (D90) is determined by dry dispersion of the sample and laser refractometry using the Malvern Mastersizer 3000.

The bottom wall may comprise a material which is porous to allow air to flow through the bottom wall. The bottom wall may comprise a material which is air-resistant, for example a material having a non-porous wall structure, but which is perforated to allow air to flow through controlled-size openings. The bottom wall can include one or more of said openings. Preferably, the cup body including the side wall and bottom wall comprises a material which is air-resistant. The flange may also comprise such a material. The openings are needed to allow air to flow through the bottom wall. The air-permeable bottom wall promotes air flow through the aerosol generating article thereby optimising aerosol generation and transfer to the user, for example via a mouthpiece of an aerosol generating device.

The closure may comprise a material which is porous and/or comprises openings to allow air and vapour to flow through the closure. The closure may comprise a porous material selected from the group consisting of porous paper, non-woven fabric, a polymer sheet, and combinations thereof. The closure may include one or more perforations. The closure may comprise a material which is itself resistant to air such that the openings or perforations are needed to allow air (and other fluids including vapour and aerosol) to flow through the closure. In addition to retaining the plant-based aerosol generating material in the cup, the air-permeable closure advantageously promotes air flow through the aerosol generating article thereby optimising aerosol generation and transfer to the user, for example via a mouthpiece of an aerosol generating device. The closure may comprise the same material as the bottom wall.

By "air-resistant" is meant a material that is not necessarily a barrier to oxygen during storage but a material that at least does not allow the flow of air and vapour during use.

The cup may comprise one or more of paper, cellulose fibres and binder, cotton, silk, polysaccharide polymer, starch, or compostable polyester (according to EN13432). These materials may be made air-resistant such as by their composition or by surface coating or lamination and made permeable by perforations or openings. The cup is cheap and easy to manufacture and is safe for use even at high temperatures. The self-supporting moulded form of the cup enables the cup to retain its shape and facilitates handling of the aerosol generating article, for example during manufacture and/or by a user.

The cup and/or closure may further contain tobacco and/or flavour. The tobacco and/or flavour may improve or mask the taste of the packaging ingredients, e.g. paper, to give a more pleasant taste. The flavour may be tobacco, fruit, plant, nut, flower and so on. The tobacco and/or flavour may be contained as an ingredient of the paper. The tobacco may be embedded in the paper or applied thereon such as by coating or layering. The tobacco may be in the form particles, flakes, leaf fragments, strip(s), layer(s) and combinations thereof.

The aerosol generating article may comprise at least two, and preferably three or more, substantially planar inductively heatable susceptor elements which may be spaced from each other in an axial direction of the cup, i.e. along a cup axis extending between the bottom wall and the open end. The at least two substantially planar inductively heatable susceptor elements may be spaced from the bottom wall and the closure at the open end of the cup. With such an arrangement, a maximum transfer of heat from the inductively heatable susceptor elements to the plant-based aerosol generating material is achieved during use of the aerosol generating article with an aerosol generating device.

In some embodiments, at least part, and preferably all, of the inductively heatable susceptor elements are planar and preferably annular in a radial direction of the cup. This allows a plurality of inductively heatable susceptor elements to be positioned in the cup.

The inductively heatable susceptor elements may be spaced from each other by a uniform distance. The uniform spacing between the inductively heatable susceptor elements ensures that the plant-based aerosol generating material is heated uniformly during use of the aerosol generating article with an aerosol generating device.

A layer of plant-based aerosol generating material may be positioned between adjacent inductively heatable susceptor elements. Positioning a layer of the plant-based aerosol generating material between adjacent inductively heatable susceptor elements ensures that a maximum amount of heat is transferred to the aerosol generating material from the inductively heatable susceptor elements during use of the aerosol generating article with an aerosol generating device. This in turn ensures that a sufficient amount of aerosol is generated.

The plant-based aerosol generating material may be any type of solid or semi-solid material. For example, the plant-based aerosol generating material typically contains a mixture of powdered or crumbed material. Other example types of aerosol generating solids may include granules, pellets, shreds, strands, particles, gel, strips, loose leaves, cut leaves, cut filler, porous material, foam material or sheets. The plant-based aerosol generating material may comprise tobacco. It may advantageously comprise reconstituted tobacco.

The foam material may comprise a plurality of fine particles (e.g. tobacco particles). The tobacco particles may have a particle size (D90) between 50 and 180 µm, preferably between 60 and 140 µm, further preferably between 65 and 125 µm, even further preferably between 70 and 110 µm, particularly preferably between 75 and 90 µm, e.g. having a particle size (D90) of about 80 µm. The foam material may further comprise an aerosol forming agent such as propylene glycol, glycerol or a combination thereof. The aerosol forming agent can further comprise water. According to certain embodiments, no water is contained, though, since water in aerosol form can burn the mouth of a user. Water can be contained in an amount of 0 to 15 wt. % of the weight of the foam material, e.g. 5 to 10 wt. %. The foam material may further comprise a solvent and/or an acid and/or an ester in an amount of up to 15 wt. %, based on the total weight of the foam material, preferably up to 5 wt. %. The foam material may further comprise a foam forming agent. The foam forming agent may be non-protein containing polysaccharide. The foam forming agent may be selected from the group consisting of agar, gellan gum, lecithin, polyglycerol esters of fatty acids, glycerol esters of fatty acids, sorbitan esters of fatty acids, and/or mixtures thereof, without being limited thereto. A preferred foam forming agent is gellan gum. The foam material may comprise a foam stabilizing agent. The foam stabilizing agent may comprise cellulose gum, hydroxyalkylated carbohydrates, derivatives thereof, e.g. salts thereof, preferably alkali metal salts thereof, e.g. sodium and/or potassium salts thereof, and mixtures thereof. Both of the cellulose gum and the hydroxyalkylated carbohydrates are not particularly restricted. According to certain, preferred, embodiments, the foam stabilizing agent is a cellulose gum, particularly a carboxymethylcellulose, or a derivative thereof. An exemplary, preferred, cellulose gum which may be used in the present invention is CEKOL® 2000 and/or Ceroga 4550C (C.E. Roeper GmbH), a purified sodium carboxymethylcellulose each. Another class of suitable foam stabilizing agents are hydroxyalkylated carbohydrates, and more preferably cellulose ethers and derivatives thereof. A cellulose ether or derivative thereof that can be used can have at least one substituent selected from the group consisting of methyl, ethyl, hydroxyethyl and hydroxypropyl groups. It can further be substituted with a linear or branched substituted or unsubstituted alkyl radicals having 1 to 20 carbon atoms or an aralkyl radical having 7 to 20 carbon atoms. Such radical is preferably attached by an ether linkage. Suitable substituents can include e.g. a hydroxy group, a carboxy group with 1 to 4 carbon atoms, etc. According to certain embodiments the cellulose ether is selected from hydroxyethylcellulose, methylcellulose, methylhydroxyethylcellulose, a volume of water and/or a moisture additive, such as a humectant. The foam material may be porous, which is open pored and may allow a flow of air and/or vapour through the foam material. The foam material may have an aeration of at least 4 vol. %, preferably having an aeration of at least 5 vol. %, e.g. 5 to 7 vol. %, based on the total volume of the foam material. In a first example, the foam material contains 16 wt. % of tobacco powder, 28 wt. % of propylene glycol (PG), 42 wt. % of glycerine (G), 2 wt. % of purified water, 4 wt. % of gellan gum, 8 wt. % of Ceroga 4550C. In a second example, the foam material contains 33 wt. % tobacco powder, 16 wt. % propylene glycol, 24 wt. % glycerine, 4 wt. % purified water, 7 wt. % gellan gum and 16 wt. % Ceroga 4550.

The plant-based aerosol generating material may comprise tobacco material and an aerosol former in a ratio by weight comprised between 0.2:1 and 4:1, preferably between 0.52:1 and 2:1. The aerosol former, which acts as a humectant, may include polyhydric alcohols and mixtures thereof such as glycerine or propylene glycol. Typically, the plant-based aerosol generating material may comprise an aerosol-former content of between approximately 5% and approximately 50% on a dry weight basis.

Upon heating, the plant-based aerosol generating material may release volatile compounds. The volatile compounds may include nicotine or flavour compounds such as tobacco flavouring.

The plant-based aerosol generating material may have a particle size, for example a sieved particle size, less than 2 mm, preferably less than 1.7 mm. The density of the plant-based aerosol generating material in the cup may be between 300 g/l and 450 g/l, preferably between 350 g/l and 400 g/l, most preferably about 380 g/l. With this arrangement, an aerosol with good characteristics may be generated during use of the aerosol generating article with an aerosol generating device. Preferably, the aerosol generating article contains about 150 to 250 mg, preferably about 200 mg of plant-based aerosol generating material.

The or each inductively heatable susceptor element may comprise one or more, but not limited, of aluminium, iron, nickel, stainless steel and alloys thereof, e.g. Nickel Chromium or Nickel Copper.

The or each inductively heatable susceptor element may comprise a disc or a ring-shaped susceptor element. The use of a ring-shaped susceptor element is advantageous because the central opening in the susceptor element facilitates the flow of fluid (i.e. air and/or vapour and/or aerosol) through the aerosol generating article during use of the aerosol generating article with an aerosol generating device.

The or each ring-shaped susceptor element may have an external diameter between 6 mm and 10 mm, preferably about 8 mm, an inner diameter between 1 mm and 5 mm, preferably 3 about mm, and a thickness between 30 μm and 100 μm, preferably about 50 μm.

The cup may have a wall thickness between 0.3 mm and 1 mm, preferably between 0.4 mm and 0.6 mm, most preferably about 0.5 mm.

The cup may have a substantially cylindrical inner cavity. The use of a cylindrical inner cavity is particularly suited to accommodating disc-shaped or ring-shaped susceptor elements.

The cup may have a height between 9 mm and 10 mm, a body diameter between 10 mm and 11 mm, and a flange diameter between 13 mm and 15 mm.

The cup may comprise one or more positioning members configured for positioning the or each inductively heatable susceptor element at a predetermined distance from the bottom wall and from the open end of the cup and/or for positioning a plurality of inductively heatable susceptor elements at predetermined distances from each other. The inductively heatable susceptor element(s) can be easily and reliably positioned in the cup in a predetermined position with respect to the aerosol generating material, thereby ensuring that uniform heating of the aerosol generating material can be achieved. The use of a positioning member can also help to ensure that the inductively heatable susceptor element is correctly positioned for coupling with an electromagnetic field during use of the aerosol generating article with an aerosol generating device, thereby ensuring that maximum heat generation is achieved in the inductively heatable susceptor element.

The positioning member may comprise a retaining surface which may extend continuously in a circumferential direction of an inside wall of the cup. With this arrangement, the inductively heatable susceptor element is reliably supported around its periphery. The positioning member may comprise at least two, preferably three or more, separate retaining surfaces at circumferentially spaced locations inside the cup. With this arrangement, the periphery of the inductively heatable susceptor element is supported at discrete circumferential positions, thereby increasing the contact area between the aerosol generating material and the inductively heatable susceptor element around its periphery and maximising the amount of heat transfer to the aerosol generating material.

The or each positioning member may comprise a circumferential step or a plurality of circumferentially discontinuous radial segments or a plurality of circumferentially discontinuous radial segments affixed to or being integral to the cup. Reliable positioning of the inductively heatable susceptor element(s) in the cup is assured by the positioning member(s).

The cup may include a cup axis extending between the open end and the bottom wall and at least two of said positioning members at different locations along the cup axis. The positioning member located along the cup axis nearest to the open end may be closer to an inside wall of the cup than the other positioning member(s). The positioning members ensure that a uniform distribution of the inductively heatable susceptor elements throughout the plant-based aerosol generating material can be achieved and this in turn ensures a uniform transfer of heat from the inductively heatable susceptor elements to the plant-based aerosol generating material during use of the aerosol generating article with an aerosol generating device.

The cup may further comprise a stopper extending from the side wall in a radially inward direction. The stopper facilitates reliable and accurate positioning of the inductively heatable susceptor element in the cup in a direction orthogonal to the cup axis, for example in the radial direction.

The circumferential step or each of said discontinuous radial segments may include the stopper and the positioning member. This provides a simple and robust structure.

In one aspect, the closure may be attached to the flange by a snap-fit connection. Alternatively or in addition, the closure may be adhered to the flange. For example, the closure may be glued or welded to the flange. The closure is thereby securely and reliably attached to the flange, ensuring that the aerosol generating material and the inductively heatable susceptor element(s) are retained in the cup.

The snap-fit connection may include a continuously extending circumferential hook at the peripheral edge of the closure which cooperates with the flange. The snap-fit connection may alternatively include a plurality of circumferentially spaced hook members at the peripheral edge of the closure which cooperate with the flange. In an alternative, the snap-fit connection may include a continuously extending circumferential hook at the peripheral edge of the cup, e.g. at the flange, which cooperates with the closure. The snap-fit connection may alternatively include a plurality of circumferentially spaced hook members at the peripheral edge of the cup e.g. at the flange, which cooperate with the closure.

The flange may comprise upper and lower flange portions which may project inwardly across the open end of the cup and which may define a recess therebetween. The periphery of the closure may be locatable in the recess to provide the snap-fit connection. The upper and lower flange portions may be continuous circumferential flange portions and the recess may be a continuous circumferential recess in which the periphery of the closure may be locatable to provide the snap-fit connection.

BRIEF DESCRIPTION OF THE DRAWINGS

FIG. 3b is a cross-sectional view along the line A-A in FIG. 3a;

FIGS. 5b and 5c are respectively views from opposite sides of the closure of FIG. 5a;

FIGS. 6b and 6c are respectively views from opposite sides of the closure of FIG. 6a;

DETAILED DESCRIPTION OF EMBODIMENTS

Embodiments of the present disclosure will now be described by way of example only and with reference to the accompanying drawings.

Figure 1:
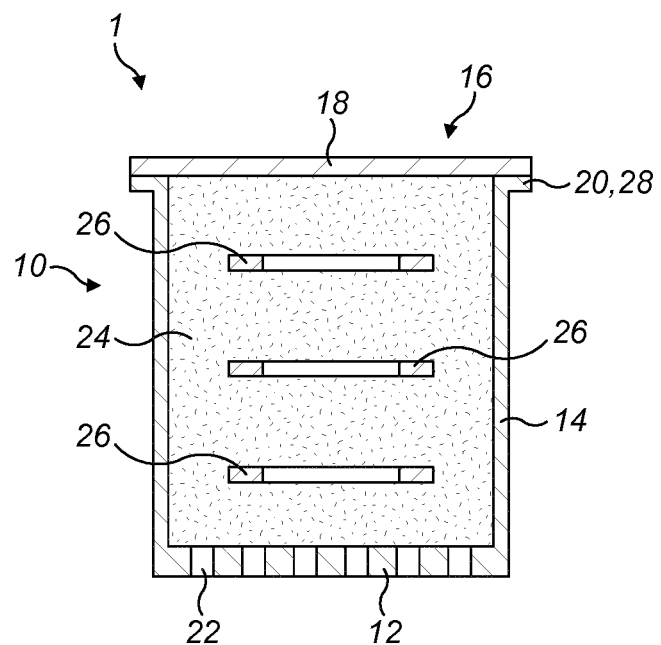
FIG. 1 is diagrammatic cross-sectional side view of an aerosol generating article comprising a first example of a cup containing a plant-based aerosol generating material and a plurality of ring-shaped inductively heatable susceptor elements.
Figure 2:
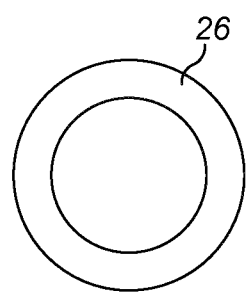
FIG. 2 is a plan view of one of the ring-shaped inductively heatable susceptor elements.

Referring initially to FIGS. 1 and 2, there is shown a first example of an aerosol generating article 1 for use with an aerosol generating device comprising an electromagnetic field generator (e.g. an induction heating system comprising an induction coil). The aerosol generating article 1 comprises a first example of a cylindrical cup 10 having a substantially circular bottom wall 12, a substantially cylindrical side wall 14 and a substantially circular open end 16 sealed by a substantially circular closure 18 affixed to a flange 20 at the open end 16 of the cup 10.

The cylindrical cup 10 is typically a paper cup, for example a moulded paper cup having a self-supporting moulded form. The bottom wall 12 is air-permeable and in the illustrated embodiment includes a plurality of openings or perforations 22. In some embodiments, the paper (or other material) from which the cup 10 is manufactured may have a porous structure which allows air to flow through the bottom wall 12 without the need for the openings or perforations 22.

The cup 10 contains a plant-based aerosol generating material 24, for example a solid or semi-solid material which can have a powdered or crumbed form with a sieved particle size less than 1.7 mm. The plant-based aerosol generating material 24 also comprises an aerosol-former, such as glycerine or propylene glycol, which acts as a humectant. Typically, the plant-based aerosol generating material 24 may comprise an aerosol-former content of between approximately 30% and approximately 50% on a dry weight basis, and possibly approximately 40% on a dry weight basis. Upon being heated, the plant-based aerosol generating material 24 releases volatile compounds possibly including nicotine or flavour compounds such as tobacco flavouring.

The cup 10 also contains a plurality of ring-shaped inductively heatable susceptor elements 26. The inductively heatable susceptor elements 26 are arranged coaxially inside the cylindrical cup 10 with respect to a cup axis extending between the bottom wall 12 and the open end 16 and are spaced apart in the axial direction along the cup axis. When an alternating electromagnetic field is applied in the vicinity of the inductively heatable susceptor elements 26 during use of the article 1 in an aerosol generating device, heat is generated in the inductively heatable susceptor elements 26 due to eddy currents and magnetic hysteresis losses and the heat is transferred from the inductively heatable susceptor elements 26 to the plant-based aerosol generating material 24 to heat the plant-based aerosol generating material 24 without burning it and to thereby generate a vapour which cools and condenses to form an aerosol for inhalation by a user. The inductively heatable susceptor elements 26 are in contact over substantially their entire surfaces with the plant-based aerosol generating material 24, thus enabling heat to be transferred directly, and therefore efficiently, from the inductively heatable susceptor elements 26 to the plant-based aerosol generating material 24.

The closure 18 at the open end 16 retains the plant-based aerosol generating material 24 and the inductively heatable susceptor elements 26 inside the cup 10. It will be understood by one of ordinary skill in the art that the closure 18 needs to be air-permeable so that a vapour or aerosol generated due to heating of the plant-based aerosol generating material 24 can flow out of the cylindrical cup 10 during use of the aerosol generating article 1 in an aerosol generating device. In the example illustrated in FIG. 1, closure 18 comprises a porous material through which air and vapour can flow. The flange 20 comprises an outwardly extending circular lip 28 and the closure 18 is affixed to the circular lip 28 by an adhesive or by welding, for example using an ultrasonic welding technique or a hot press.

Referring now to FIGS. 3a to 3d, there is shown a second example of a cylindrical cup 110 which is similar to the cup 10 described above with reference to FIG. 1 and in which corresponding elements are designated using the same reference numerals.

Figure 3A:
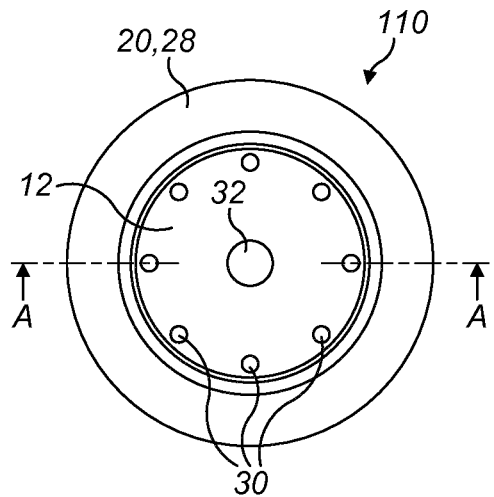
FIG. 3a is a plan view of a second example of a cup.
Figure 3B:
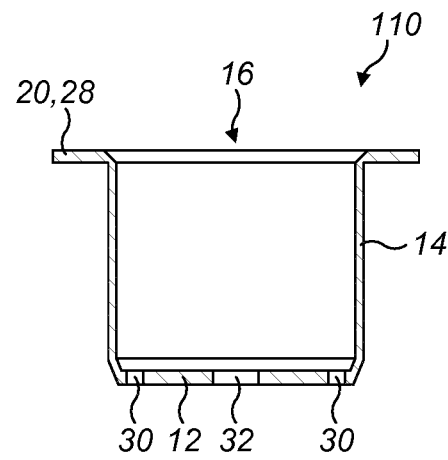
Figure 3C:
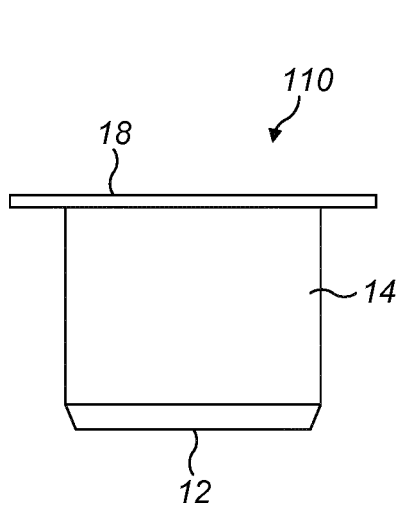
FIG. 3c is a side view of the cup of FIGS. 3a and 3b.
Figure 3D:
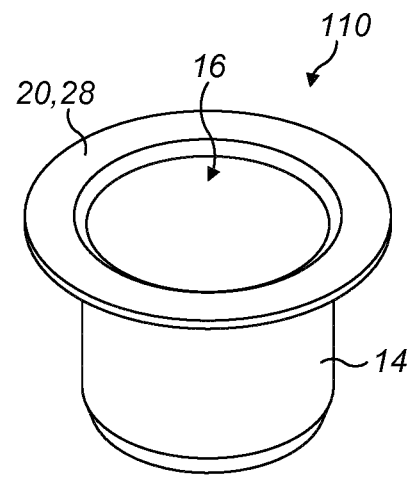
FIG. 3d is a perspective view of the cup of FIGS. 3a to 3c.

As best seen in FIGS. 3a and 3b, the bottom wall 12 comprises a first opening in the form of a central opening 32 and a plurality of second openings in the form of circumferentially spaced peripheral openings 30 which are positioned around the central opening 32. The peripheral openings 30 are substantially circular and have a diameter typically between 0.5 mm and 1 mm. The central opening 32 is also substantially circular and has a larger diameter than the peripheral openings 30, typically between 1.2 mm and 2.5 mm.

Figure 4A:
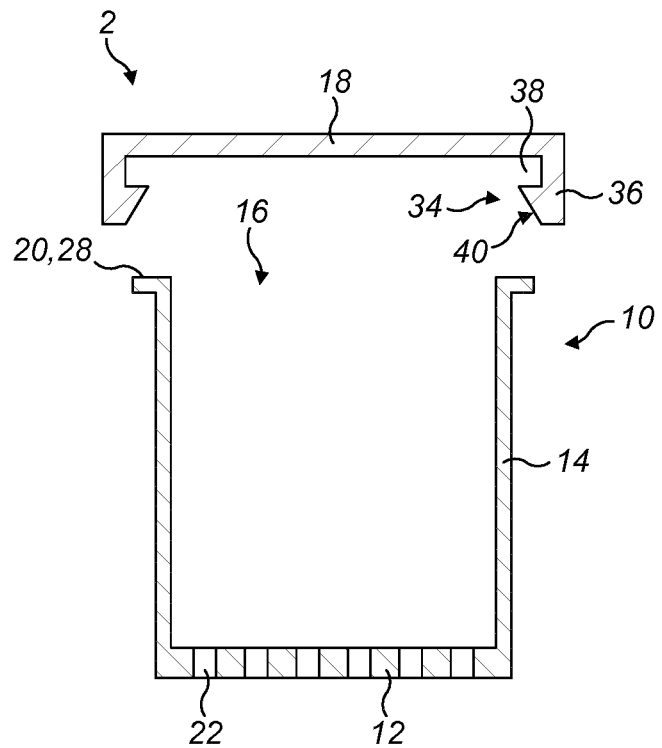
FIGS. 4a and 4b are diagrammatic cross-sectional side views of an aerosol generating article similar to that shown in FIG. 1, showing a first example of a snap-fit connection between the cup and a closure.
Figure 4B:
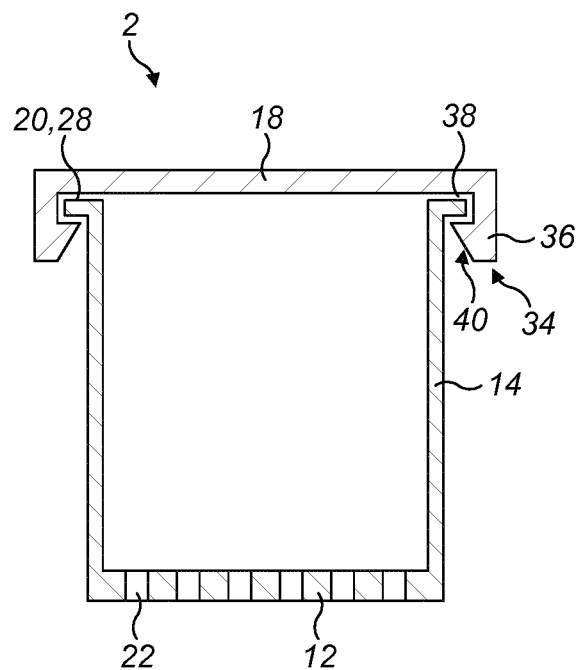

Referring now to FIGS. 4a and 4b, there is shown a second example of an aerosol generating article 2 which is similar to the aerosol generating article 1 described above with reference to FIGS. 1 and 2 and in which corresponding elements are designated using the same reference numerals. It will be noted that the plant-based aerosol generating material 24 and the inductively heatable susceptor elements 26 are not shown in FIGS. 4a and 4b.

The aerosol generating article 2 comprises a closure 18 having a snap-fit connection 34. The snap-fit connection 34 comprises a circumferentially extending hook 36 forming a continuously extending circumferential recess 38 in which the flange 20 can be securely located as shown in FIG. 4b. The hook 36 includes a tapered surface 40 which allows it to slide past the flange 20 when the closure 18 is moved in the direction of the cup axis from the position shown in FIG. 4a to the position shown in FIG. 4b. It will be understood by one of ordinary skill in the art that the side wall 14 of the cup 10 proximate the open end 16 and/or the hook 36 may flex as the closure 18 is pressed onto the flange 20 before one or both components return to their original positions, to thereby allow the flange 20 to be accommodated and securely retained in the circumferential recess 38 as shown in FIG. 4b.

Figure 5A:
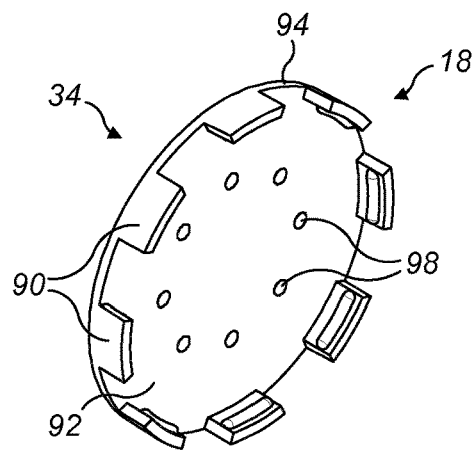
FIG. 5a is a diagrammatic perspective view of an alternative closure for use with first example of the snap-fit connection of FIGS. 4a and 4b.
Figure 5B:
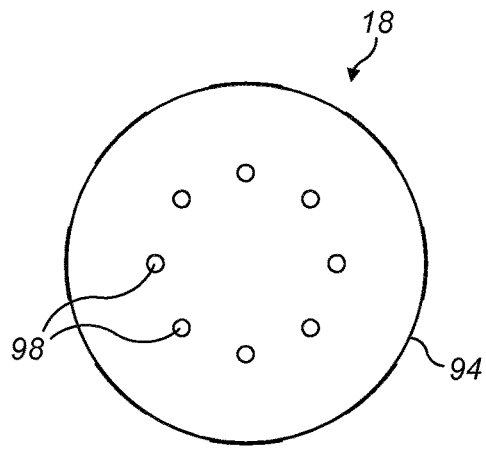
Figure 5C:
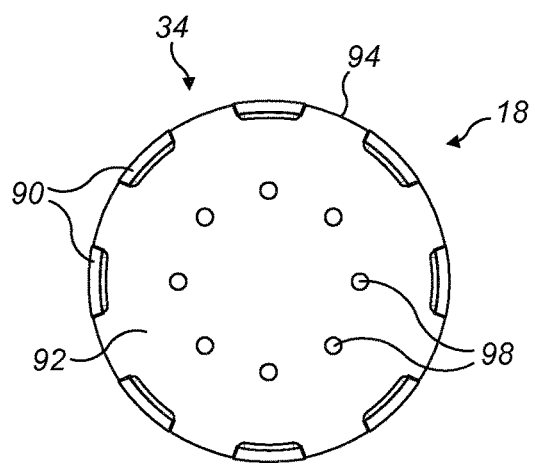

FIGS. 5a to 5c illustrate an alternative closure 18 having a snap-fit connection 34 which can be used with the cup 10 described above. The snap-fit connection 34 comprises a plurality of circumferentially-spaced hook members 90 which extend downwardly from a lower surface 92 of the closure 18 so that the peripheral edge 94 of the closure 18 has a smooth edge contour when the closure 18 is viewed from the top (see FIG. 5b). Each hook member 90 forms a recess in which the flange 20 can be located in the same manner as described above with reference to FIG. 4b. The hook members 90 individually flex as the closure 18 is pressed onto the flange 20 before the hook members 90 return to their original positions, to thereby allow the flange 20 to be accommodated and securely retained in the recesses.

Figure 6A:
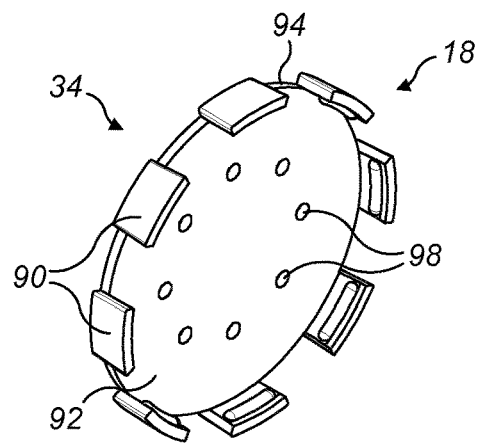
FIG. 6a is a diagrammatic perspective view of another alternative closure for use with first example of the snap-fit connection of FIGS. 4a and 4b.
Figure 6B:
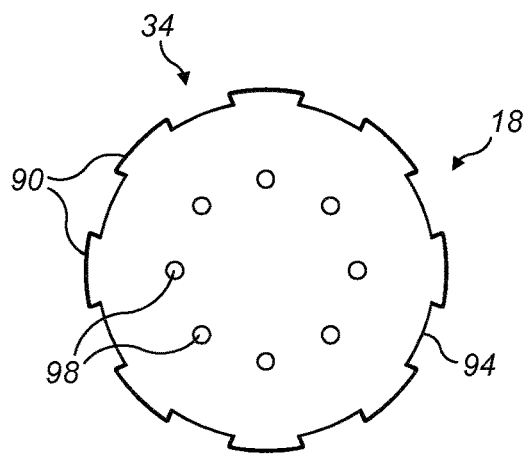
Figure 6C:
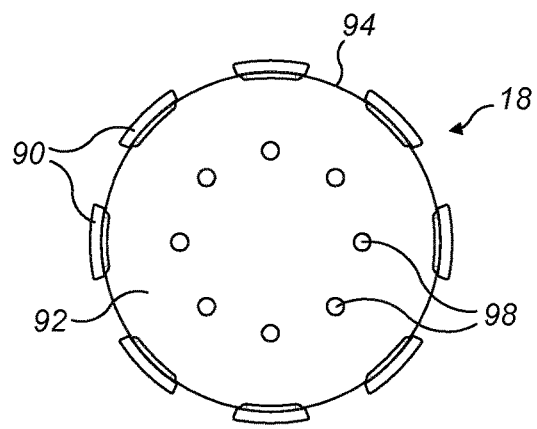

FIGS. 6a to 6c illustrate an alternative closure 18 having a snap-fit connection 34 which can be used with the cup 10 described above. The snap-fit connection 34 comprises a plurality of circumferentially-spaced hook members 90 which extend downwardly from the peripheral edge 94 of the closure 18 to provide a crenelated edge contour when the closure 18 is viewed from the top (see FIG. 6b). Each hook member 90 forms a recess in which the flange 20 can be located in the same manner as described above with reference to FIG. 4b. The hook members 90 individually flex as the closure 18 is pressed onto the flange 20 before the hook members 90 return to their original positions, to thereby allow the flange 20 to be accommodated and securely retained in the recesses.

It will be noted that the closures 18 illustrated in FIGS. 5 and 6 comprise a plurality of circumferentially arranged openings 98 which allow air and vapour to flow through the closure 18. The openings 98 could, however, be omitted if the closure 18 has a sufficiently porous structure to allow air and vapour to flow therethrough.

Figure 7A:
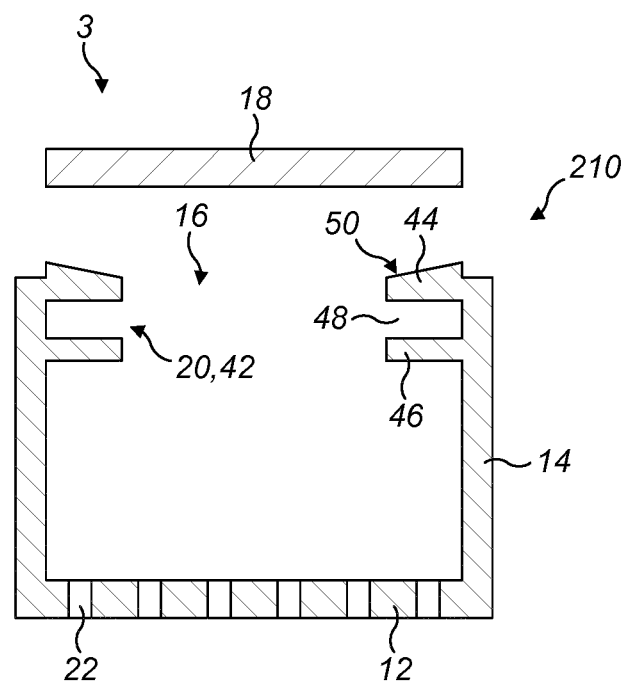
FIGS. 7a and 7b are diagrammatic cross-sectional side views of an aerosol generating article similar to that shown in FIG. 1, showing a second example of a snap-fit connection between the cup and a closure.
Figure 7B:
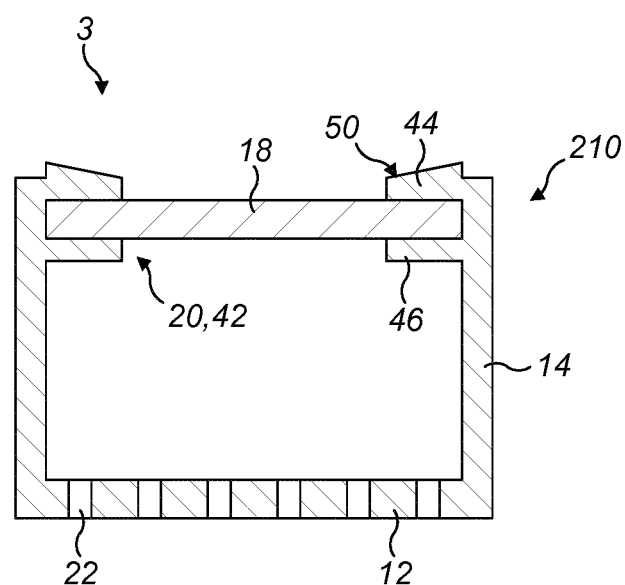

Referring now to FIGS. 7a and 7b, there is shown a third example of an aerosol generating article 3 which is similar to the aerosol generating articles 1, 2 described above and in which corresponding elements are designated using the same reference numerals. It will again be noted that the plant-based aerosol generating material 24 and the inductively heatable susceptor elements 26 are not shown in FIGS. 7a and 7b.

The aerosol generating article 3 comprises a cup 210 having a flange 20 which projects in the radially inward direction and forms a snap-fit connection 42. In more detail, the snap-fit connection 42 comprises a continuously extending upper circumferential flange portion 44 and a continuously extending lower circumferential flange portion 46 which define therebetween a continuously extending circumferential recess 48 in which the periphery of the closure 18 can be securely retained as shown in FIG. 7b. The upper circumferential flange portion 44 includes a tapered surface 50 which facilitates movement of the closure 18 from the position shown in FIG. 7a into the circumferential recess 48 as shown in FIG. 7b. In particular, it will be understood by one of ordinary skill in the art that the side wall 14 of the cup 210 proximate the open end 16 may be caused to flex radially outwardly as the closure 18 is pressed onto the tapered surface 50 and that the upper circumferential flange portion 44 may also be deformed outwardly and/or downwardly before both components return to their original positions, to thereby allow the periphery of the closure 18 to be accommodated in the circumferential recess 48 as shown in FIG. 7b.

Figure 8A:
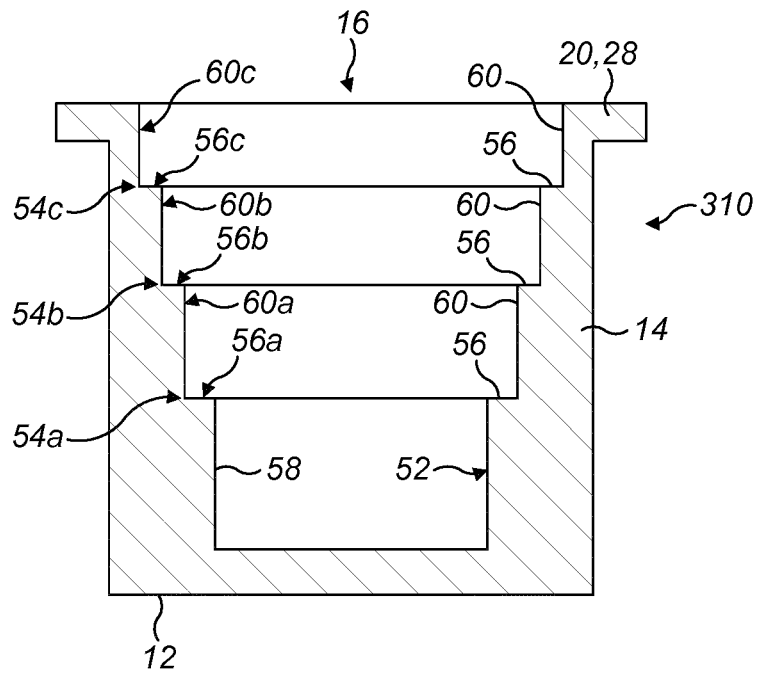
FIGS. 8a and 8b are respectively a diagrammatic cross-sectional side view and a diagrammatic plan view of a cup including positioning members which extend continuously around the inner surface of a side wall of the cup.
Figure 8B:
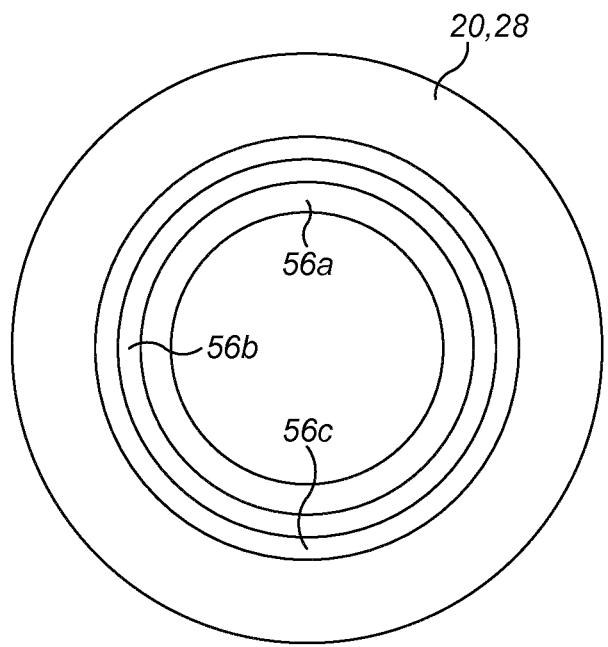
Figure 8C:
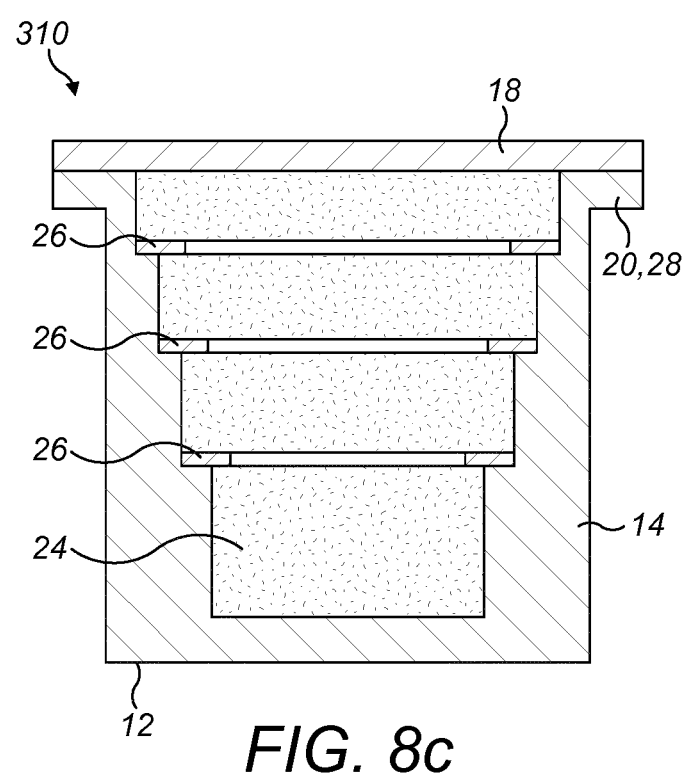
FIG. 8c is a diagrammatic cross-sectional side view of an aerosol generating article comprising the cup of FIGS. 8a and 8b.

Referring now to FIGS. 8a to 8c, there is shown an example of a cup 310 in which the side wall 14 has a stepped inner surface 52 comprising a plurality of steps 54a-c.

The steps 54a-c define a plurality of radially extending retaining surfaces 56a-c which extend continuously in a circumferential direction of the inside wall 58 of the cup 310. The retaining surfaces 56a-c act as positioning members 56 for positioning the inductively heatable susceptor elements 26 axially in the cup 310, along the cup axis, as best seen in FIG. 8c. Due to the stepped configuration of the inner surface 52, the retaining surface 56c positioned along the cup axis nearest to the open end 16 is closer to the side wall 14 than the retaining surfaces 56a, 56b below it. Similarly, the retaining surface 56b is closer to the side wall 14 than the retaining surface 56a below it. In one embodiment, the retaining surfaces 56a-c are spaced by a uniform distance.

The steps 54a-c also define a plurality of axially extending abutment surfaces 60a-c which extend continuously in a circumferential direction of the inside wall 58 of the cup 310. The abutment surfaces 60a-c act as stoppers 60 for positioning the inductively heatable susceptor elements 26 radially in the cup 310, for example so that they are coaxial with the cup axis, as best seen in FIG. 8c. Due to the stepped configuration of the inner surface 52, the abutment surface 60c positioned along the cup axis nearest to the open end 16 is closer to the side wall 14 than the abutment surfaces 60a, 60b below it. Similarly, the abutment surface 60b is closer to the side wall 14 than the abutment surface 60a below it.

Figure 9A:
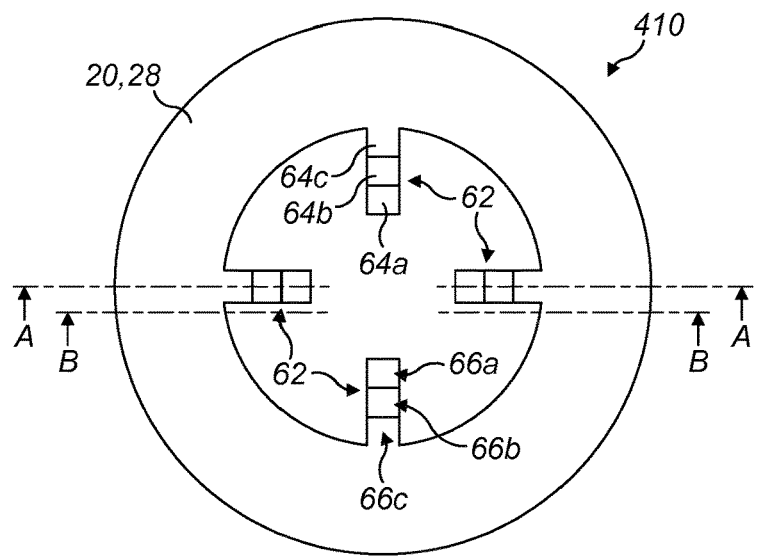
FIG. 9a is a diagrammatic plan view of a cup including positioning members at discrete circumferential locations around the inner surface of the side wall of the cup.
Figure 9B:
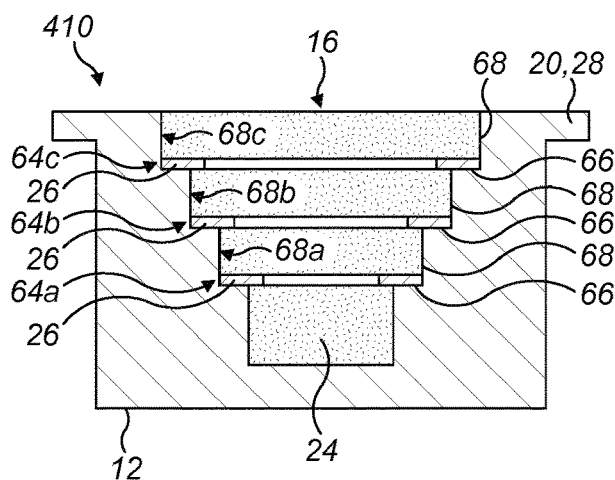
FIGS. 9b and 9c are diagrammatic cross-sectional views respectively along the lines A-A and B-B in FIG. 9a after filling the cup with plant-based aerosol generating material and inductively heatable susceptor elements.
Figure 9C:
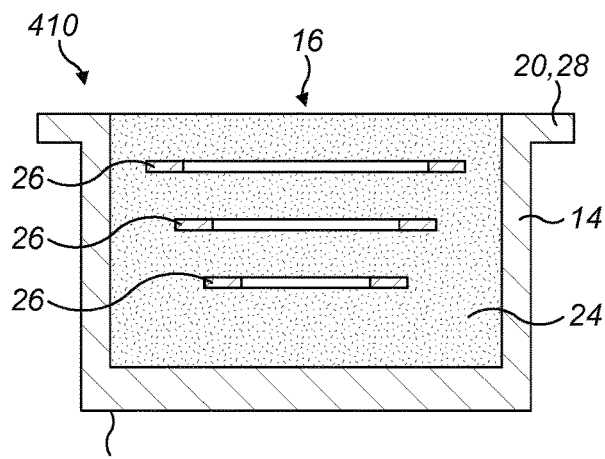

Referring now to FIGS. 9a to 9c, there is shown an example of a cup 410 in which includes a plurality of stepped segments 62 at circumferentially spaced locations inside the cup. Each stepped segment 62 includes a plurality of steps 64a-c.

The steps 64a-c define a plurality of radially extending retaining surfaces 66a-c which act as positioning members 66 for positioning the inductively heatable susceptor elements 26 axially in the cup 410, along the cup axis, as described above with reference to FIGS. 8a-c and as shown in FIGS. 9b and 9c. The steps 64a-c also define a plurality of axially extending abutment surfaces 68a-c which act as stoppers 68 for positioning the inductively heatable susceptor elements 26 radially in the cup 410, as also described above with reference to FIGS. 8a-c and as shown in FIGS. 9b and 9c.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating article comprising:
a cup containing a plant-based aerosol generating material and at least one inductively heatable susceptor element, wherein the cup comprises an open end and a bottom wall;
the cup having a self-supporting moulded form and including a flange at the open end and a closure attached to the flange;
wherein the closure and/or bottom wall is porous or comprises one or more openings, and
wherein the cup comprises one or more positioning members for positioning the or each inductively heatable susceptor element at a predetermined distance from the bottom wall and from the open end of the cup and/or for positioning a plurality of inductively heatable susceptor elements at predetermined distances from each other.

2. The aerosol generating article according to claim 1, wherein the bottom wall comprises a plurality of openings.

3. The aerosol generating article according to claim 2, wherein the plurality of openings have a diameter between 0.5 mm and 5 mm.

4. The aerosol generating article according to claim 1, wherein the closure comprises a porous material comprising one or more of porous paper, non-woven fabric or a polymer sheet.

5. The aerosol generating article according to claim 1, wherein the cup comprises one or more of paper, cellulose fibres and binder, cotton, silk, polysaccharide polymer, starch, or compostable polyester.

6. The aerosol generating article according to claim 1, wherein the material of the cup and/or the closure comprises tobacco and/or flavour.

7. The aerosol generating article according to claim 1, wherein the aerosol generating article comprises at least two substantially planar inductively heatable susceptor elements spaced from each other in an axial direction of the cup and spaced from the bottom wall and the closure at the open end of the cup.

8. The aerosol generating article according to claim 7, wherein at least part of the inductively heatable susceptor elements are planar in a radial direction of the cup.

9. The aerosol generating article according to claim 7, wherein the inductively heatable susceptor elements are spaced from each other by a uniform distance.

10. The aerosol generating article according to claim 6, wherein a layer of plant-based aerosol generating material is positioned between adjacent inductively heatable susceptor elements.

11. The aerosol generating article according to claim 1, wherein the plant-based aerosol generating material contains a mixture of powdered or crumbed material.

12. The aerosol generating article according to claim 1, wherein the plant-based aerosol generating material comprises tobacco material and an aerosol former in a ratio by weight comprised between 0.2:1 and 4:1.

13. The aerosol generating article according to claim 1, wherein the plant-based aerosol generating material has a sieved particle size less than 2 mm.

14. The aerosol generating article according to claim 1, wherein the density of the plant-based aerosol generating material in the cup is between 300 g/l and 450 g/l.

15. The aerosol generating article according to claim 1, wherein the or each inductively heatable susceptor element comprises aluminium or an aluminium alloy.

16. The aerosol generating article according to claim 1, wherein the or each inductively heatable susceptor element comprises a disc or a ring-shaped susceptor element.

17. The aerosol generating article according to claim 16, wherein the or each ring-shaped susceptor element has an external diameter between 6 mm and 10 mm, an inner diameter between 1 mm and 5 mm, and a thickness between 30 μm and 100 μm.

18. The aerosol generating article according to claim 1, wherein the cup has a wall thickness between 0.3 mm and 1 mm.

19. The aerosol generating article according to claim 1, wherein the cup has a cylindrical inner cavity.

20. The aerosol generating article according to claim 19, wherein the cup has a height between 9 mm and 10 mm, a body diameter between 10 mm and 11 mm, and a flange diameter between 13 mm and 15 mm.

21. The aerosol generating article according to claim 1, wherein the or each positioning member comprises a circumferential step or a plurality of circumferentially discontinuous radial segments or a plurality of circumferentially discontinuous radial segments affixed to or being integral to the cup.

22. The aerosol generating article according to claim 1, wherein the cup comprises a stopper extending from the side wall in a radially inward direction.

23. The aerosol generating article according to claim 21, wherein the circumferential step includes a stopper and the positioning member.

24. The aerosol generating article according to claim 1, wherein the closure is attached to the flange by a snap-fit connection.

25. The aerosol generating article according to claim 24, wherein the snap-fit connection includes a continuously extending circumferential hook at the peripheral edge of the closure which cooperates with the flange.

26. The aerosol generating article according to claim 24, wherein the snap-fit connection includes a plurality of circumferentially spaced hook members at the peripheral edge of the closure which cooperate with the flange.

27. The aerosol generating article according to claim 24, wherein the flange comprises inwardly projecting upper and lower flange portions which define a recess therebetween, and the periphery of the closure is locatable in the recess to provide the snap-fit connection.

28. The aerosol generating article according to claim 27, wherein the upper and lower flange portions are continuous circumferential flange portions and the recess is a continuous circumferential recess.

* * * * *